United States Patent [19]

Bristol

[11] Patent Number: 5,978,448
[45] Date of Patent: Nov. 2, 1999

[54] BEARING PRELOAD ARRANGEMENT WITH LINEAR BEARING COMPONENT FOR X-RAY TUBE

[75] Inventor: Brent L. Bristol, Phoenix, Ariz.

[73] Assignee: General Electric Company, Milwaukee, Wis.

[21] Appl. No.: 09/010,459

[22] Filed: Jan. 21, 1998

[51] Int. Cl.$^6$ .................................................. H01J 35/10
[52] U.S. Cl. ........................................ 378/132; 378/144
[58] Field of Search ................................ 378/125, 132, 378/144

[56] References Cited

U.S. PATENT DOCUMENTS

| | | | |
|---|---|---|---|
| 4,878,235 | 10/1989 | Anderson | 378/136 |
| 5,185,774 | 2/1993 | Klostermann | 378/125 |
| 5,241,577 | 8/1993 | Burke et al. | 378/135 |

Primary Examiner—David P. Porta
Assistant Examiner—Drew A. Dunn
Attorney, Agent, or Firm—James O. Skarsten; Christian G. Cabou; Phyllis Y. Price

[57] ABSTRACT

In an X-ray tube provided with a frame, a rotary bearing, and a target and anode supported by the rotary bearing for rotation with respect to the frame, an improved arrangement is provided for preloading the rotary bearing. The arrangement comprises a housing fixably joined to the frame, the housing provided with a cylindrical inner wall and disposed to receive the rotary bearing, and a spring or the like for applying an axial force to the bearing race, to selectively preload the bearing balls or other rotary elements of the bearing. The arrangement further comprises a linear bearing positioned between the bearing race and the cylindrical inner wall, to enable the bearing race to move axially with respect to the housing in response to the applied axial force. The linear bearing comprises a selected number of linear bearing rows in closely spaced relationship with one another, each of the linear bearing rows comprising a number of linear bearing balls positioned in a circular array around the rotary bearing race.

11 Claims, 4 Drawing Sheets

BEARING PRELOAD ARRANGEMENT WITH LINEAR BEARING COMPONENT FOR X-RAY TUBE

BACKGROUND OF THE INVENTION

The invention disclosed and claimed herein is generally directed to an improved arrangement for preloading bearings, wherein the bearings are employed to support an X-ray tube target and other components for rotation. More particularly, the invention pertains to an arrangement of such type for preventing effects of thermal expansion, which occur during the production of X-rays, from interfering with bearing preload.

As is well known, modern X-ray tubes often employ tungsten electron beam targets, mounted upon rotating anodes, for the production of X-rays. The target and anode are supported for rotation on at least two bearings, which serve as the interface between the rotating and stationary parts of the X-ray tube. As is further well known, a substantial amount of heat is usually produced in the tube when X-rays are generated. Thus, the rotary bearings must operate over a broad range of temperatures, so that individual bearing components, as well as structure adjacent thereto, are subject to thermal growth which can alter the internal clearances in the bearings. As a result, the bearings tend to become too loose or too tight, radially or axially.

In an attempt to obtain consistent bearing noise and load distribution over a broad range of temperatures, preload springs have been employed to minimize variations in bearing ball loading, as temperature changes from room temperature to the operating temperature. In order for the preload springs to function properly, one or more bearings in the system must be free to easily move, or float, axially. In the past, a preload force was typically applied to the bearing balls through the outer bearing race, or bearing ring, which was in sliding contact with the cylindrical wall of the bearing housing. However, conditions of high vacuum and temperature, generally found in an X-ray tube, tend to produce very clean surfaces which adhere to one another. If the bearing ring adheres to the adjacent housing wall, the bearing preload cannot be properly applied to the bearing balls, whereby the system loses its preload. Such situation can also occur if thermal growth eliminates all clearance between the bearing ring and the housing wall. Too little preload results in increased bearing noise, and excessive preload slows rotation of the rotary tube components, thereby reducing bearing life. Various soft metals and solid lubricants have been employed in an effort to relieve the tendency to adhere, but the outcome has been inconsistent and unreliable.

SUMMARY OF THE INVENTION

To prevent the loss of bearing preload, the invention proposes to replace the sliding contact between the bearing outer ring and the bearing housing with a rolling contact, namely by interposing a matrix of small balls therebetween, thus providing an angular contact bearing supported by a linear bearing. Accordingly, the invention is directed to an arrangement for use in an X-ray tube having a frame, a rotary bearing which comprises a race and rotary bearing balls or the like, and a target, anode and anode shaft supported by the rotary bearing for rotation with respect to the frame. The arrangement or apparatus of the invention is disposed to apply a preload to the rotary bearing, and includes a housing fixably joined to the frame, the housing provided with a cylindrical inner wall and disposed to receive the rotary bearing. The apparatus further includes means for applying an axial force to the bearing race, to selectively preload the rotary bearing. A linear bearing means is positioned between the rotary bearing race and the cylindrical inner wall of the housing to maintain a specified spacing therebetween, and to enable the bearing race to move axially with respect to the housing, as the preload force is applied to the race.

In a preferred embodiment, the linear bearing means comprises a selected number of rows of balls distributed around the outer diameter of the bearing in closely spaced relationship with one another, each of the linear bearing rows comprising a number of linear bearing balls positioned around a circular array in spaced-apart relationship. The linear bearing means includes means for holding the linear bearing balls of respective rings in a specified positional relationship, relative to one another. Preferably, the holding means comprises a thin sheet of selected material provided with a matrix array of circular holes, the sheet being formed into a cylinder sized to fit within the space between the cylindrical inner wall and the bearing race. Each of the circular holes is disposed to receive one of the linear bearing balls, to hold each received ball in its specified position.

OBJECTS OF THE INVENTION

An object of the invention is to provide an improved preload arrangement or apparatus for a rotary bearing used to support an X-ray tube target and anode for rotation.

Another object is to provide a preload arrangement of the above type, wherein the bearing race or like component is enabled to freely move axially, with respect to adjacent bearing support structure, in order to transfer a selected preload force to the balls or other rolling elements of the bearing.

These and other objects of the invention will become more readily apparent from the ensuing specification, taken together with the accompanying drawings.

DETAILED DESCRIPTION OF THE PREFERRED EMBODIMENT

Figure 1:
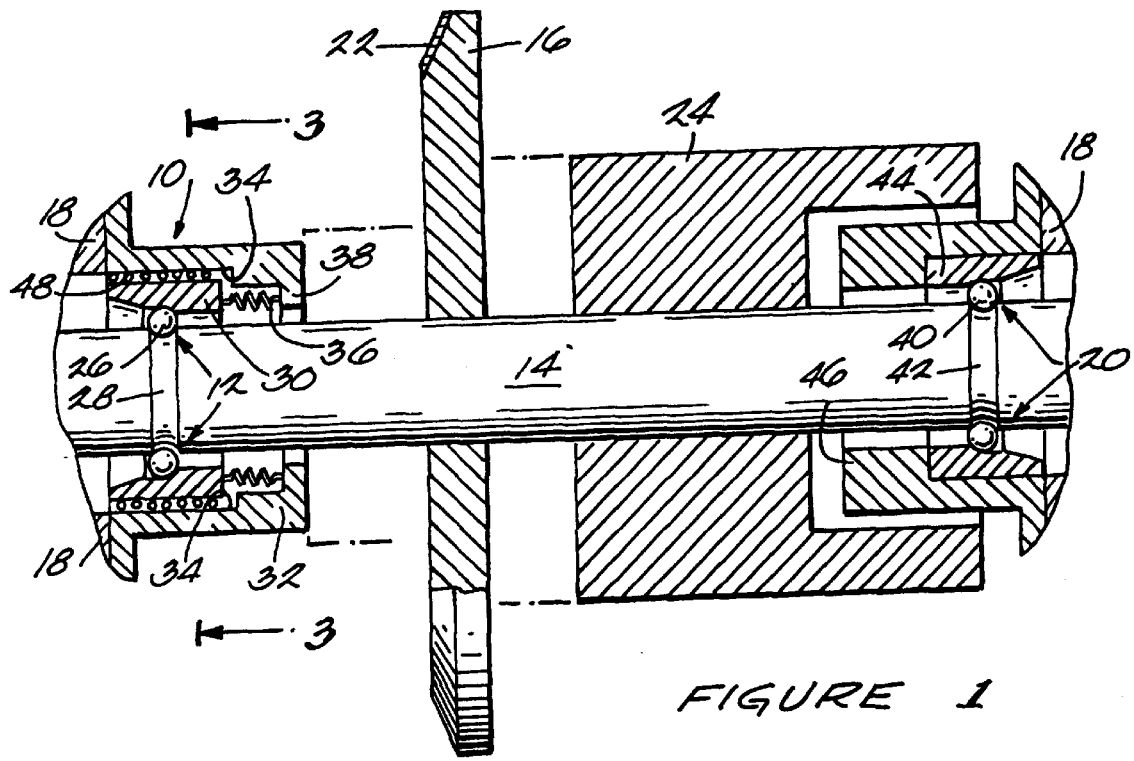
FIG. 1 is a sectional view showing an embodiment of the invention, in connection with certain conventional X-ray tube components.

Referring to FIG. 1, there are shown a number of components conventionally employed in an X-ray tube. There is further shown a bearing preload apparatus or arrangement 10, constructed in accordance with the principles of the invention, for applying a preload to an angular contact rotary bearing 12. Bearing 12 supports an anode shaft 14, as well as an X-ray tube anode 16 mounted thereon, for rotation with respect to a fixed X-ray tube frame 18. Only small portions of frame 18 are shown, for simplicity of illustration, since frame 18 may be of conventionally available design.

Referring further to FIG. 1, there is shown shaft 14 also supported by a rotary bearing 20, so that anode 16 is mounted between the two bearings 12 and 20. Such mounting arrangement is referred to in the art as a straddle bearing arrangement. As is known, anode 16 comprises a solid circular disk, and an electron beam target 22, comprising an annular track of tungsten or the like, is positioned around the outer circumference of the disk. To produce X-rays, a cathode (not shown) directs a stream of electrons (not shown) onto a small segment of the track 18. The electrons and track segment interact to generate X-rays. However, such interaction also produces a substantial amount of heat. Accordingly, anode 16 is continually rotated, so that the electron stream impinges upon a continually changing portion of track 22. Bearings 12 and 20 and anode shaft 14 are provided to enable such anode rotation. The large amount of heat produced during X-ray generation causes thermal growth in respective X-ray tube components, resulting in the problems described above.

To rotatably drive shaft 14 and anode 16, rotor windings 24 are joined to shaft 14. The rotor windings are energized by means of spaced-apart stator windings (not shown) mounted onto frame 18. Other conventional X-ray tube components, such as an outer cover therefor, are likewise not shown, for simplicity of illustration.

Referring further to FIG. 1, there is shown bearing 12 provided with rotary balls 26, which are positioned around and partially contained within an annular grove 28 formed in shaft 14. Balls 26 are trapped or held in place around shaft 14 by means of an outer bearing ring or bearing race 30. The rotary balls 26 and race 30, which collectively comprise bearing 12, are retained in a bearing housing 32 fixably joined to frame 18. Housing 32 is provided with a cylindrical inner wall or surface 34, having a diameter which is slightly larger than the outer diameter of race 30. Thus, a clearance or spacing is provided between race 30 and inner wall 34, allowing race 30 to freely move axially, i.e., to float, with respect to fixed bearing housing 32. Herein, axial movement refers to movement along, or in parallel relationship with, the axis of shaft 14.

As stated above, it has been found to be highly desirable to selectively preload the X-ray tube rotary bearings, to reduce both wear and bearing noise. Accordingly, a spring 36 is positioned around shaft 14, between bearing race 30 and a shoulder 38 formed in housing 32. Spring 36 is under compression, so that it acts to urge race 30 axially, in a leftward direction as viewed in FIG. 1, against rotary bearing balls 26. Thus, a force is applied through race 30 to preload balls 26.

Referring further to FIG. 1, there is shown bearing 20 comprising rotary bearing balls 40 which are positioned around and partially contained in an annular groove 42 formed in shaft 14, in like manner with the bearing balls of bearing 12. Bearing 20 further comprises a race 44 which traps the balls 40 in place. However, unlike bearing 12, the race 44 is tightly fitted within a recess formed in a bearing housing 46, fixably joined to frame 18. By providing such arrangement, the preload force described above, when applied to bearing balls 26 of bearing 12, acts through balls 26 to urge shaft 14 leftward, as viewed in FIG. 1. The shaft 14, in turn, applies a preload to the balls 40 of bearing 20. Thus, by allowing axial movement of the bearing race 30, the spring 36 is able to preload both bearings 12 and 20.

As stated above, substantial heat is produced when an X-ray tube is operated to generate X-rays. As a result, both bearing race 30 and housing 32 are subject to thermal expansion. If they were to expand into contact with one another, the spacing therebetween would be eliminated, and race 30 could become unable to move axially with respect to housing 32. This, in turn, would seriously interfere with the preloading action of spring 36. The situation could be made even worse by the tendency of clean surfaces to adhere to one another, as described above. Thus, in accordance with the invention, and to insure that race 30 will always be able to move axially with respect to housing 32, a linear bearing 48 is positioned there between.

Figure 2:
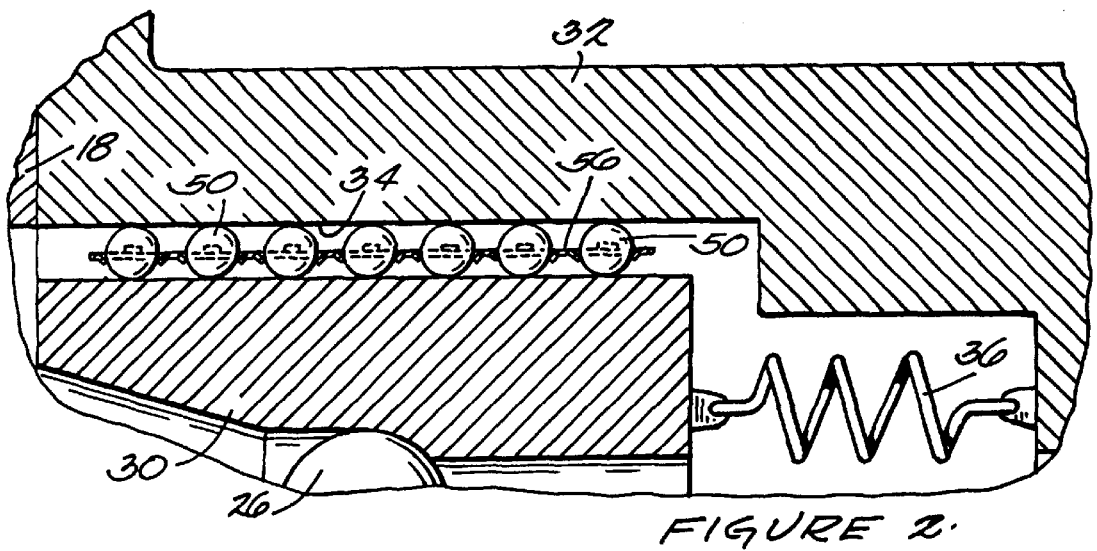
FIG. 2 is a sectional view showing a portion of FIG. 1 in greater detail.

Referring to FIGS. 1 and 2 together, there is shown linear bearing 48 comprising an array of linear bearing balls 50. The balls maintain freedom of axial motion even under moderate compression between the outer diameter of the bearing outer ring 30 the and the cylindrical wall 34 of the housing 32. The balls of linear bearing 48 make the preload system less sensitive to differential thermal expansion between such components, providing free axial movement of race 30.

Figure 3:
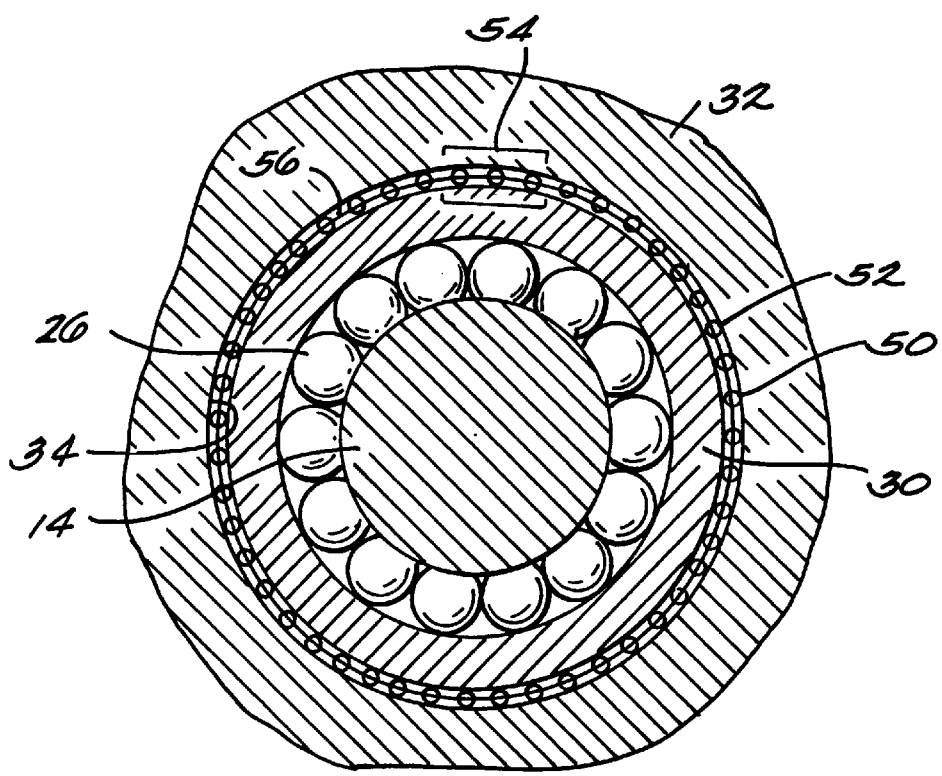
FIG. 3 is a sectional view taken along lines 3—3 of FIG. 1.

As best shown by FIG. 3, the bearing balls 50 of linear bearing 48 are respectively positioned between race 30 and cylindrical inner wall 34 to form a number of linear bearing rows 52, each surrounding race 30. FIG. 3 shows one complete linear bearing row 52. FIGS. 1 and 2 indicate that seven of such linear bearing rows are provided, slightly spaced apart from one another in an axial direction, along the clearance or spacing between race 30 and housing 32. However, it is anticipated that the number of rows 52 used in a linear bearing 48 could vary between two and ten or more, depending on design parameters for a particular application.

Figure 4:
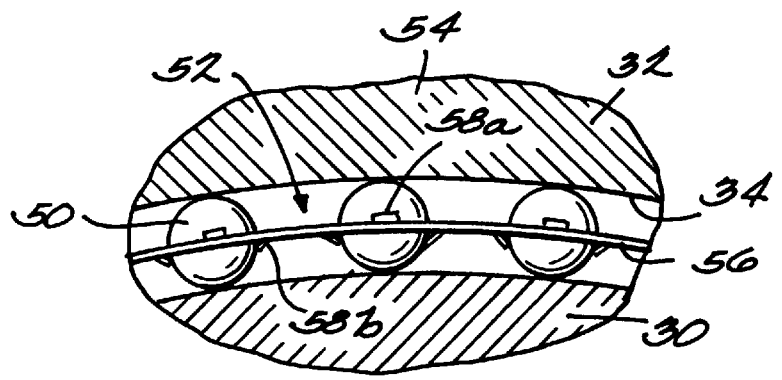
FIG. 4 is a view showing a portion of FIG. 3 in greater detail.

Referring to FIG. 4, there is shown an enlarged view of a section 54 taken from FIG. 3. FIG. 4, together with FIG. 2, depicts a linear ball retaining structure 56, which is provided to hold the respective balls 50 in place, in an arrangement wherein the linear bearing rows 52 are axially spaced apart, and the balls of a given row 52 are spaced apart from one another in a circular array between race 30 and housing 32.

Figure 5:
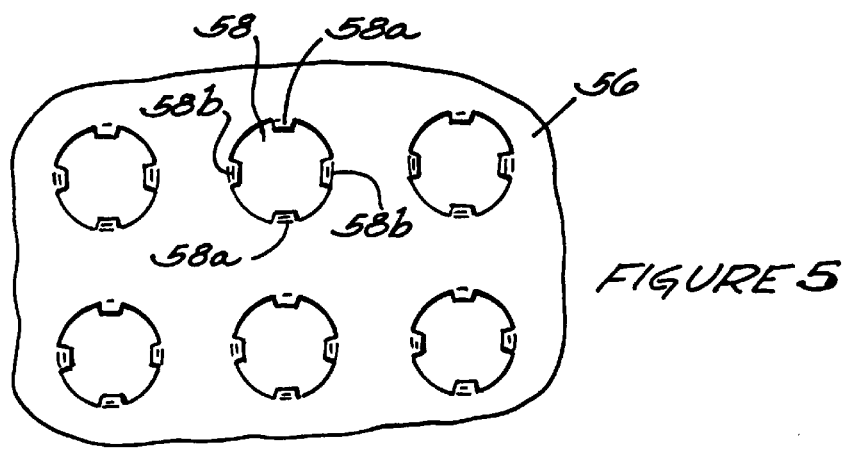
FIG. 5 is a perspective view showing a portion of a linear bearing ball retainer for the embodiment of FIG. 1.

Referring to FIG. 5, there is shown a portion of ball retaining structure 56, which comprises a sheet of thin steel or other material. A matrix array of circular holes 58 is formed in the sheet, the diameter of each hole 58 being slightly larger than the diameter of linear bearing balls 50. Accordingly, each ball 50 can be received into a hole 58 in slip fitting relationship. The balls received into one of the vertical columns of holes 58, as viewed in FIG. 5, collectively comprise the linear balls which make up a correspondingly one of the linear bearing rows 52. After holes 58 have been formed, the sheet is rolled or otherwise formed into a cylinder, to provide retaining structure 56. The diameter of the cylinder is selected so that retaining structure 56 can be positioned midway between the outer edge of race 30 and cylindrical inner wall 34 of housing 32, as best shown in FIGS. 2 and 4.

Referring further to FIG. 5, there is shown a portion of the material used for structure 56 formed into sets of tabs 58a and 58b. Each set of tabs is associated with and extends past the edge of a hole 58. For a given hole, the tabs 58a and the tabs 58b are respectively centered on lines which are generally orthogonal to each other.

Figure 6:
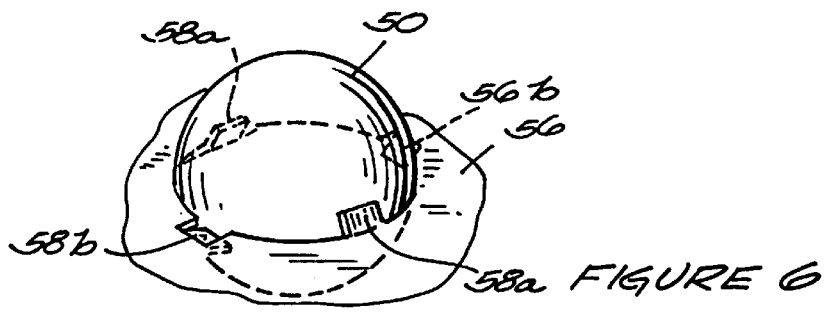
FIG. 6 is a perspective view showing a linear bearing ball for use in the embodiment of FIG. 1.

As best shown in FIG. 6, when a linear bearing ball 50 has been placed in a hole 58 of retaining structure 56, tabs 58a are bent in one direction, such as upwardly as viewed in FIG. 6. Similarly, tabs 58b are bent in the opposite direction, i.e., downwardly, as viewed in FIG. 6. The tabs 58a and 58b collectively act to hold a ball 50 within its corresponding hole 58 of structure 56. At the same time, the ball 50 is allowed to rotate freely so that linear bearing 48 can operate to perform its function.

Figure 7:
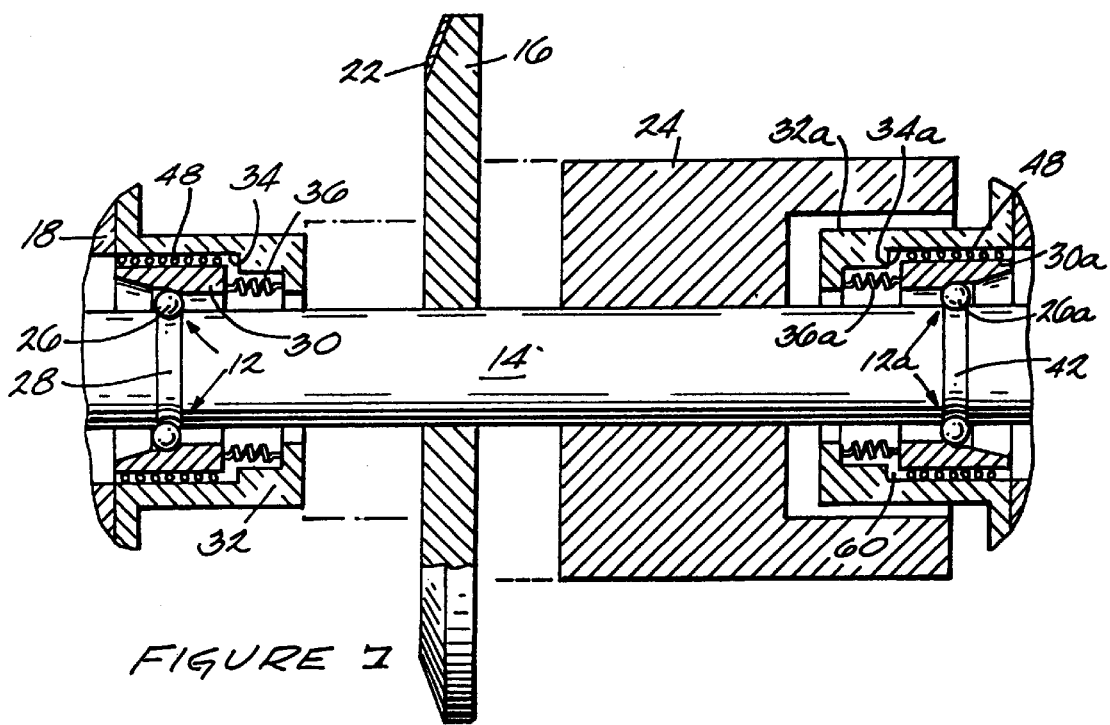
FIGS. 7 and 8 are sectional views showing respective modifications of the embodiment shown in FIG. 1.

Referring to FIG. 7, there is shown a straddle bearing arrangement similar to the arrangement of FIG. 1, except that a bearing 12a and a bearing housing 32a have been substituted for bearing 20 and housing 46, respectively. Bearing 12a and housing 32a are similar or identical to bearing 12 and housing 32, respectively. Thus, there is a spacing or clearance between cylindrical inner wall 34a of housing 32a and race 30a of bearing 12a, and a second linear bearing 48 is positioned therebetween. Moreover, a preload spring 36a, similar or identical to spring 36 is positioned to apply a preload force to race 30a, to urge race 30a axially rightward, as viewed in FIG. 7, and to thereby preload bearing balls 26a of bearing 12a. As described above, the linear bearing 48 enables race 30a, as well as race 30 of bearing 12 to float, or to move easily in an axial direction.

The straddle bearing arrangement of FIG. 7 is advantageous in that it enables axial motion of anode 16 and target 22, resulting from thermal growth of shaft 14, to be minimized. The allowable axial motion can be restricted arbitrarily, by judicious design of the space 60 which is provided between the floating bearing race 30a and the bearing housing 32a.

Figure 8:
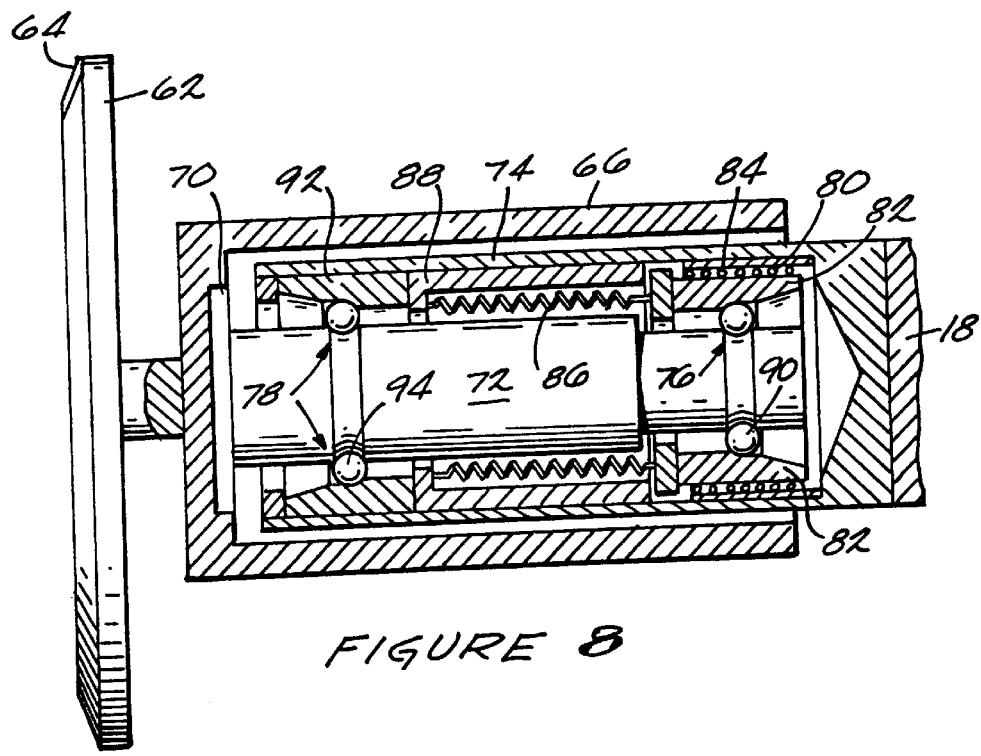

Referring to FIG. 8, there is shown a cantilever bearing arrangement, wherein an anode 62, target 64 and motor rotar 66 are mounted as an assembly to a bearing shaft hub 70, for rotation with a shaft 72 joined thereto. Shaft 72 is journaled for rotation in a housing 74, which is fixably joined to the frame 18, by means of angular contact bearings 76 and 78. A linear bearing 80, similar or identical to linear bearing 48, is positioned between race 82 of bearing 76 and a cylindrical spacer 84. Spacer 84 is press fitted into housing 74, and is formed of copper or other material to provide a surface over which the balls of linear bearing 80 can easily move. FIG. 8 further shows a preload spring 86 placed around shaft 72 and acting against a shoulder formed in a cylindrical member 88, which is fixably joined to housing 74, to apply an axially directed force to bearing race 82. Once again, by providing linear bearing 80, race 82 is able to easily move axially, to apply a preload to rotary bearing balls 90 of bearing 76.

Referring further to FIG. 8, there is shown race 92 of bearing 78 in tight fitting relationship with housing 74 in like manner with bearing 20 described above. Accordingly, the balls 94 of bearing 78 are also preloaded by a force from spring 86, acting through shaft 72 as likewise previously described. The bearing arrangement of FIG. 8 is considered to be especially useful where an unobstructed target face is required for high voltage purposes.

Figure 9:
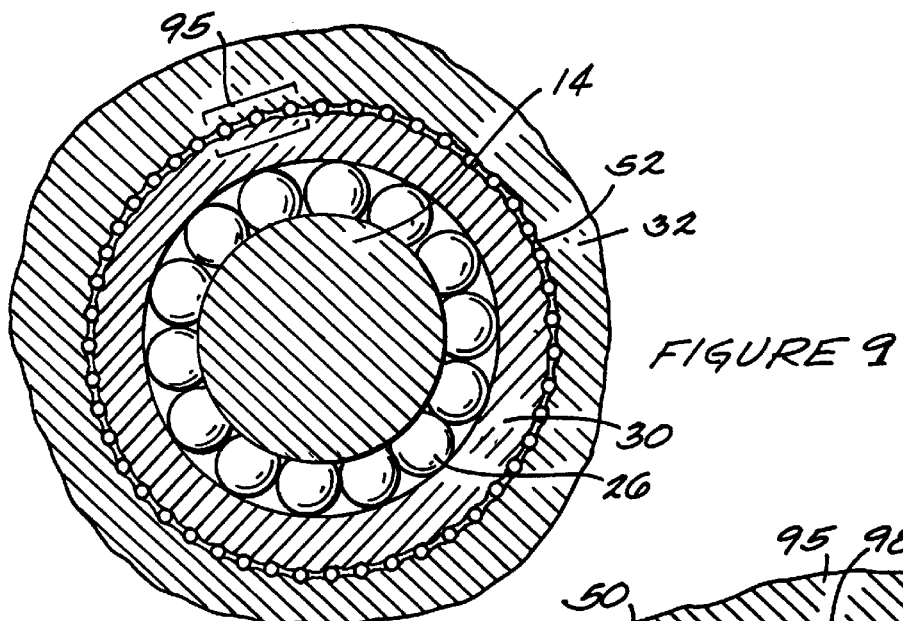
FIG. 9 is a sectional view showing a further modification of the embodiment of FIG. 1.
Figure 10:
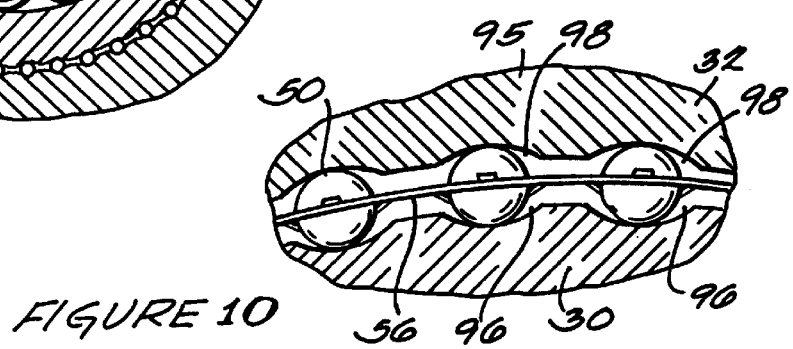
FIG. 10 is a sectional view showing a portion of FIG. 9 in greater detail.

As is well known by those of skill in the art, it would be undesirable to have an outer bearing race, such as race 30 of bearing 12 shown in FIG. 1, rotate with respect to the adjacent bearing housing 32. Such rotation, resulting from a rotary force applied to the race 30 by the shaft 14 and acting through the bearing balls 26, could cause wear and could also impede free axially movement of the race 30. Accordingly, to prevent rotation of race 30, the embodiment of the invention shown in FIG. 1 can be modified as shown in FIGS. 9 and 10. As best shown in FIG. 10, comprising a section 95 of FIG. 9, anti-rotation groves 96 are formed in race 30, each groove 96 being directed along the axis of shaft 14. In like manner, axial grooves 98 are formed in housing 32, each groove 98 being in opposed, spaced-apart parallel relationship with a groove 96. Each of the linear bearing balls 50 lying in the same horizontal row of holes 58 of bearing retainer structure 56, as viewed in FIG. 5, are positioned between the same grooves 96 and 98. Thus, the balls 50 serve to lock race 30 against rotation with respect to housing 32. At the same time, race 30 remains free to move axially.

Obviously, many other modifications and variations of the present invention are possible in light of the above teachings. It is therefore to be understood that within the scope of the disclosed concept, the invention may be practiced otherwise than as has been described.

What is claimed is:

1. In an X-ray tube provided with a frame, a rotary bearing comprising a bearing race and rotary bearing elements, and a target and anode shaft supported by the rotary bearing for rotation with respect to the frame, an arrangement for preloading the rotary bearing comprising:

a housing fixably joined to said frame, said housing provided with a cylindrical inner wall and disposed to receive said rotary bearing;

means for applying an axial force to said bearing race to selectively preload said rotary bearing elements; and linear bearing means positioned between said bearing race and said cylindrical inner wall to enable said bearing race to move axially with respect to said housing in response to said applied axial force.

2. The arrangement of claim 1 wherein:

said linear bearing means comprises a selected number of linear bearing rows in closely spaced relationship with one another, each of said linear bearing rows comprising a number of linear bearing balls positioned in a circular array around said bearing race.

3. The apparatus of claim 2 wherein:

said linear bearing means includes means for holding said linear bearing balls in respective specified positions relative to one another.

4. The apparatus of claim 3 wherein:

said holding means comprises a thin sheet of selected material provided with a matrix array of circular holes, said sheet being formed into a cylinder sized to fit within said spacing between said bearing race and said cylindrical inner wall, each of said circular holes disposed to receive one of the linear bearing balls and to hold the received ball in its specified position.

5. The apparatus of claim 4 wherein:

a set of tabs is formed in the material of said sheet adjacent to each of said circular holes, each of said tab sets serving to retain a corresponding one of the linear bearing balls within its circular hole, while allowing the retained ball to rotate.

6. The apparatus of claim 5 wherein:

said means for applying said axial force comprises a spring positioned between a shoulder formed within said housing and said bearing race, said spring urging said bearing race axially against said rotary bearing elements to selectively preload said elements.

7. The apparatus of claim 2 wherein:

said bearing race is provided with an outer edge having a set of axial grooves formed therein;

a set of corresponding axial grooves is formed in said housing inner wall, each in opposing spaced-apart relationship with one of said grooves in said race; and one of the linear bearing balls of each of said linear bearing rows is positioned between a groove in said housing wall and the opposing groove in said race.

8. The apparatus of claim 2 wherein:

said rotary bearing comprises one of two rotary bearings provided to support said target and shaft for rotation, the other of said rotary bearings being provided with a bearing race which is retained against axial movement.

9. The apparatus of claim 2 wherein:

said rotary bearing comprises one of two substantially identical rotary bearings provided to support said target and shaft for rotation, the other of said rotary bearings being provided with a linear bearing substantially identical to said linear bearing means to enable its bearing race to move axially with respect to an adjacent housing.

10. The apparatus of claim 2 wherein:

said rotary bearing comprises one of two rotary bearings provided to support said target and shaft for rotation in a cantilever arrangement.

11. The apparatus of claim 2 wherein:

said rotary bearing comprises one of two rotary bearings provided to support said target and shaft for rotation in a straddle arrangement.

* * * * *